(12) United States Patent  (10) Patent No.: US 6,587,301 B1
Smith  (45) Date of Patent: *Jul. 1, 2003

(54) SYSTEM AND METHOD FOR CALIBRATING AND CONTROLLING THE INTERNAL PRESSURE OF A HARD DISK DRIVE

(76) Inventor: Gordon James Smith, 1407 Woodview La. SW., Rochester, MN (US) 55902

(*) Notice: Subject to any disclaimer, the term of this patent is extended or adjusted under 35 U.S.C. 154(b) by 0 days.

This patent is subject to a terminal disclaimer.

(21) Appl. No.: 09/487,911

(22) Filed: Jan. 19, 2000

(51) Int. Cl.⁷ .............................................. G11B 21/02
(52) U.S. Cl. ...................................... 360/75; 360/97.02
(58) Field of Search .............................. 360/25, 31, 75, 360/97.02, 97.03, 97.04, 69

(56) References Cited

U.S. PATENT DOCUMENTS

| | | | | |
|---|---|---|---|---|
| 5,666,237 A | * | 9/1997 | Lewis | 360/75 |
| 5,764,430 A | * | 6/1998 | Ottesen et al. | 360/73.03 |
| 6,067,203 A | * | 5/2000 | Ottesen et al. | 360/73.03 |
| 6,097,559 A | * | 8/2000 | Ottesen et al. | 360/31 |
| 6,144,178 A | * | 11/2000 | Hirano et al. | 318/476 |

* cited by examiner

Primary Examiner—Andrew L. Sniezek

(57) ABSTRACT

A sealed hard disk drive contains a vacuum pump for decreasing the internal pressure inside the drive. The lower internal operating pressure decreases aerodynamic drag between the actuator arm assemblies and the rotating disks. In addition, the power consumed by the drive is reduced and the its operating temperature is lowered. The fly height of the heads relative to the disks or the head-disk interface condition is also monitored. The pump is selectively actuated in response to the measured change in flying height of the heads from their original manufactured settings. In one version, the drive is also equipped with a pressure transducer for monitoring the drives internal pressure.

13 Claims, 3 Drawing Sheets

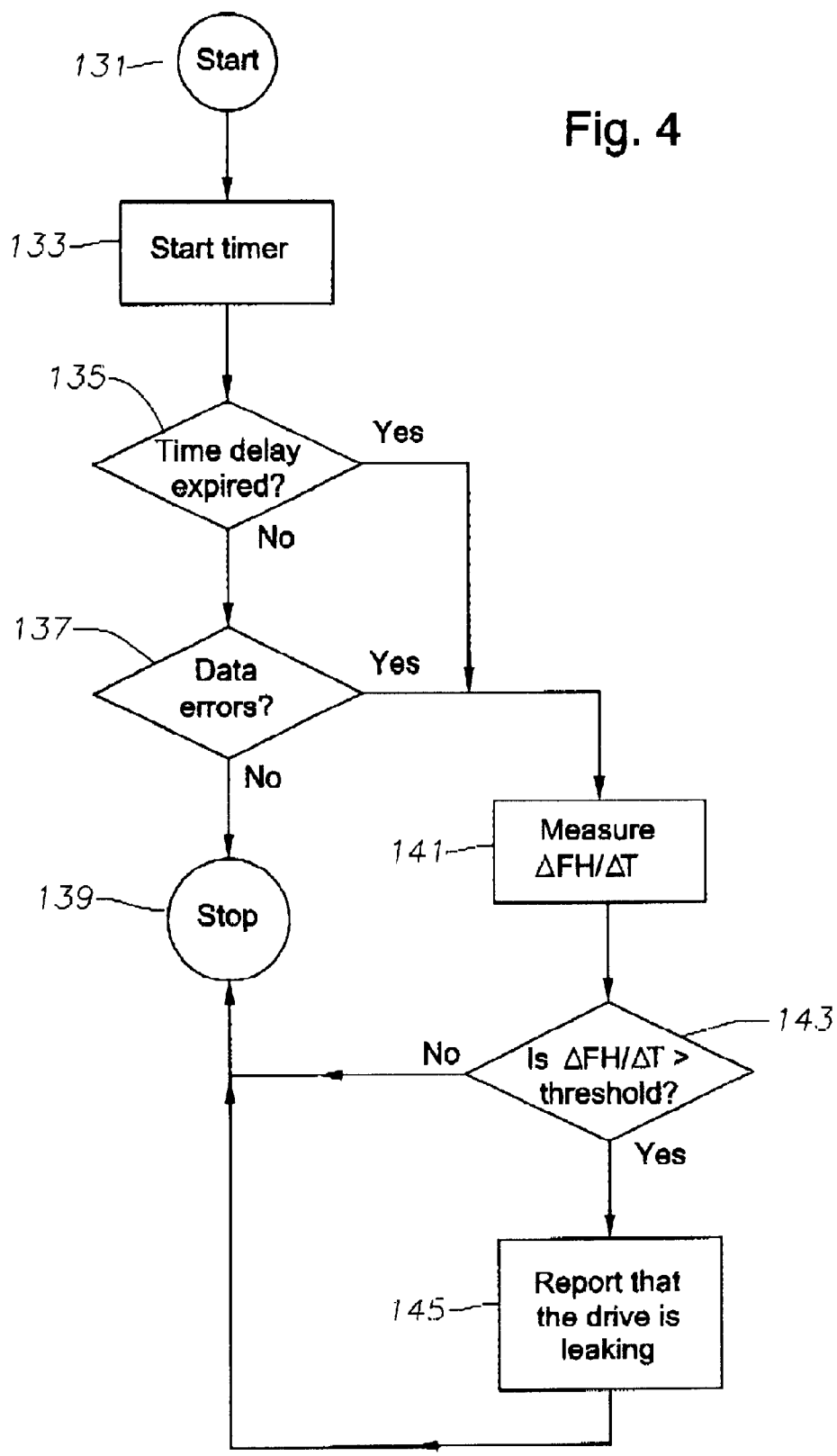

SYSTEM AND METHOD FOR CALIBRATING AND CONTROLLING THE INTERNAL PRESSURE OF A HARD DISK DRIVE

BACKGROUND OF THE INVENTION

1. Technical Field

This invention relates in general to an improved hard disk drive and in particular to altering the internal pressure of a disk drive to improve its performance. Still more particularly, the invention relates to a system and method for calibrating and controlling the internal pressure of a disk drive.

2. Description of the Prior Art

Generally, a digital data access and storage system consists of one or more storage devices that store data on storage media such as magnetic or optical data storage disks. In magnetic disk storage systems, a storage device is called a hard disk drive (HDD), which includes one or more hard disks and an HDD controller to manage local operations concerning the disks. Hard disks are rigid platters, typically made of aluminum alloy or a mixture of glass and ceramic, covered with a magnetic coating. Typically, two or three platters are stacked vertically on a common spindle that is turned by a disk drive motor at several thousand revolutions per minute (rpm).

The only other moving part within a typical HDD is the head assembly. Within most drives, one read/write head is associated with each side of each platter and flies just above or below the platter's surface. Each read/write head is connected to a semi-rigid arm apparatus which supports the entire head flying unit. More than one of such arms may be utilized together to form a single armature unit.

Each read/write head scans the hard disk platter surface during a "read" or "write" operation. The head/arm assembly is moved utilizing an actuator which is often a voice coil motor (VCM). The stator of a VCM is mounted to a base plate or casting on which is also mounted the spindle supporting the disks. The base casting is in turn mounted to a frame via a compliant suspension. When current is fed to the motor, the VCM develops force or torque which is substantially proportional to the applied current. The arm acceleration is therefore substantially proportional to the magnitude of the current. As the read/write head nears the desired track, a reverse polarity signal is applied to the actuator, causing the signal to act as a brake, and ideally causing the read/write head to stop directly over the desired track.

In the prior art, the individual enclosures or housings used to support the disk drive assemblies are typically unsealed and expose the drive components to the ambient atmospheric conditions of the surrounding environment (e.g., temperature and pressure) where the host computer system is located. Although the ambient conditions are usually sufficient to provide an adequate operational environment for most disk drives, they may be less than ideal for optimal performance under all types of operating requirements. Thus, a disk drive that is capable of enhancing its internal environmental conditions would be desirable.

SUMMARY OF THE INVENTION

A sealed computer disk drive contains a vacuum pump for decreasing the internal pressure inside the drive. The lower internal operating pressure decreases aerodynamic drag between the actuator arm assemblies and the rotating disks. In addition, the power consumed by the drive is reduced and the its operating temperature is lowered. The fly height of the heads relative to the disks or the head-disk interface condition is also monitored. The pump is selectively actuated in response to the measured change in flying height of the heads from their original manufactured settings. In one version, the drive is also equipped with a pressure transducer for monitoring the drives internal pressure.

Accordingly, it is an object of the invention to provide an improved computer hard disk drive.

It is an additional object of the invention to alter the internal operating pressure of a disk drive to improve its performance.

Still another object of the invention is to provide a system and method for calibrating and controlling the internal operating pressure of a disk drive.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 4 is a flowchart of an illustrative embodiment of the method of the present invention during operation.

DETAILED DESCRIPTION OF THE PREFERRED EMBODIMENT

Figure 1:
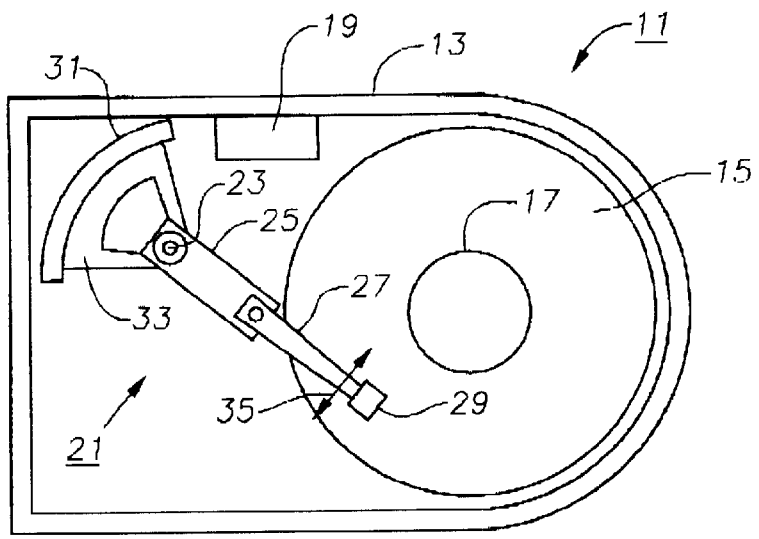
FIG. 1 is a schematic drawing of a computer hard disk drive constructed in accordance with the invention.

Referring to FIG. 1, a schematic drawing of an information storage system comprising a magnetic hard disk file or drive 11 for a computer system is shown. Optimally, drive 11 is included in an array configuration of two or more drives. Drive 11 has a disk enclosure or base 13 containing a plurality of stacked, parallel magnetic disks 15 (one shown) which are closely spaced apart. Disks 15 are rotated by a spindle motor located therebelow about a central drive hub 17. A plurality of stacked, parallel actuator arms 21 (one shown) are pivotally mounted to base 13 about a pivot assembly 23. A drive controller 19 selectively moves arms 21 relative to disks 15 for interaction therewith.

In the embodiment shown, each arm 21 comprises a mounting support 25, a pair of parallel, cantilevered load beams or suspensions 27 extending from each mounting support 25, and a head slider assembly 29 having at least one magnetic read/write head secured to each suspension 27 for magnetically reading data from or magnetically writing data to disks 15. Suspensions 27 have a spring-like quality which biases or maintains them in parallel relationship relative to one another. A motor assembly 31 having a conventional voice coil motor is also mounted to pivot assembly 23 opposite head slider assemblies 29. Movement of an actuator driver 33 (indicated by arrow 35) moves head slider assemblies 29 radially across tracks on the disks 15 until the heads on assemblies 29 settle on the target tracks. The head slider assemblies 29 operate in a conventional manner and always move in unison with one another, unless drive 11 uses a split actuator (not shown) wherein the arms move independently of one another.

Figure 2:
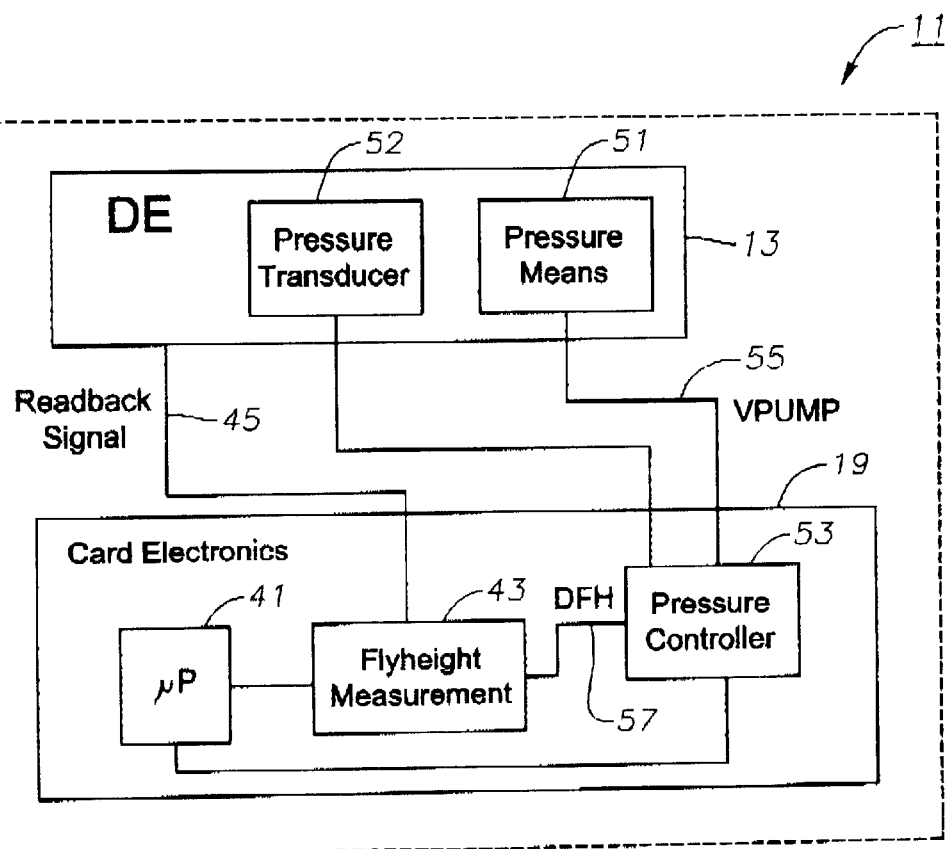
FIG. 2 is a simplified block diagram of the drive of FIG. 1.

Referring now to FIG. 2, a simplified block diagram of a single disk drive 11 constructed in accordance with the present invention is shown. Although many variants are possible, this diagram encompasses the salient features necessary for describing the invention. Drive controller 19 has a microprocessor 41 and a fly height measurement device 43 that monitors the head-disk interface condition via a readback signal 45. A pressure means 51 is mounted to the base 13 for manipulating its internal pressure. Pressure means 51 may comprise a number of different devices such as a compressor or a pump for selectively manipulating the atmosphere inside base 13. Pressure means 51 may be driven by the spindle motor or other means.

In the preferred embodiment, the internal pressure of drive 11 is decreased (typically 0.7 atm or lower) via pressure means 51 to decrease the density of the air inside base 13 and allow the air bearing surfaces of the heads to achieve a lower flying height above the surfaces of their respective disks 15. This arrangement assists in optimization of drive 11. A pressure transducer 52 may be used to monitor the pressure level of base 13. To avoid the additional cost of a pressure measurement device for control, the flying height of the heads can be monitored by using the readback signal 45 as a feedback loop for pressure means 51. Since flying height is sensitive to local pressure and measurements can be made rapidly, it is also possible to use fly height measurement device 43 to monitor the proper operation of pressure means 51 and to calibrate the pressure transducer 52 if one is used.

Pressure means 51 is actuated by a pressure controller 53 via control signal 55 based on the measured change in flying height 57 from device 43. The change in flying height 57 is the difference between the known flying height of a head (or head average) from values stored at the time drive 11 was manufactured. In other words, the fly height values that are stored during manufacturing can be subtracted from the operational or current fly height measurements to yield the measured change in flying height 57. Since the internal pressure of base 13 is set with high accuracy during manufacturing, the measurements 57 are also very accurate. For example, the pressure in base 13 is originally set to exactly 1.0 atm while fly height measurements are made and stored at manufacturing. If the current operating pressure for drive 11 is 0.7 atm, then the fly height of a typical head with a negative pressure air bearing surface will be reduced by 30%.

The anticipated fly height change can be verified by taking measurement 57 which is useful for manufacturing verification of proper fly height. The upper and lower limits for measurement 57 can be set individually or for a population of drives 11. For example, if drive 11 has a very low flying head, the lower limit for pressure in base 13 is increased to reduce the risk of a head crash. However, if the heads in drive 11 are flying higher than normal, the lower pressure limit is reduced. Pressure means 51 is simply switched on and off depending on the current measurement 57 which may be measured periodically.

In addition, a higher than expected duty cycle for pressure means 51 may indicate other problems in the system such as a malfunctioning pressure means 51 or a pressure leak in base 13. To diagnose this situation, microprocessor 41 actuates pressure means 51 to achieve a desired level for measurement 57 and then deactivates pressure means 51 (i.e., pressure controller 53 is disengaged). Next, the change in measurement 57 over time is measured. If the current rate of change in measurement 57 exceeds the rate measured during manufacturing, the base 13 is leaking. Otherwise, pressure means 51 is assumed to be malfunctioning. The latter condition is further diagnosed by monitoring measurement 57 over time while pressure means 51 is operating. For reliable operation of the vacuum system, it is preferred to have a backup measurement. Therefore, even if pressure transducer 52 is used, the change in flying height measurement 57 is available for verification purposes.

Figure 3:
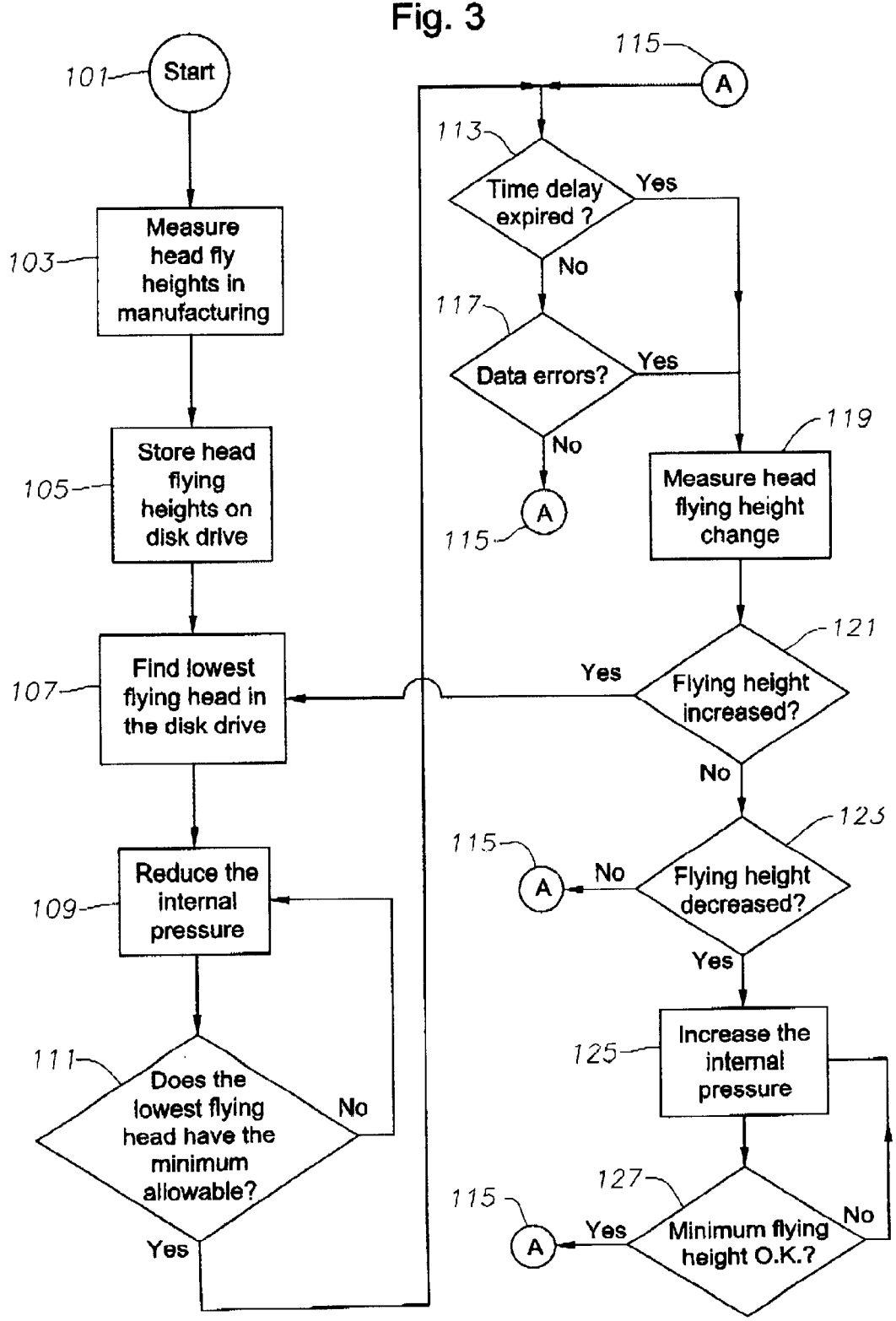
FIG. 3 is a high level, logic flowchart of an illustrative embodiment of the method and system of the present invention utilized by the disk drive of FIG. 1 during manufacturing.

Referring now to FIG. 3, there is illustrated one embodiment of a high level, logic flow diagram of a method for enhancing the performance of a hard disk drive in accordance with the invention. The method begins as illustrated at block 101. During manufacturing, the head flying height is measured, as shown in block 103, and is stored at block 105. The process proceeds to block 107 wherein the lowest flying head in the drive is detected. As illustrated at block 109, the internal pressure of the drive is then gradually lowered until the lowest flying head reaches the minimum allowable flying height (see block 111).

The process proceeds to block 113 where the drive may be tested after block 111, or used operationally as depicted at block 115. Block 113 depicts the periodic timing for reevaluation of the drive. If the time delay has not expired (depicted at block 117), the drive is searched for data errors. If no errors are found, the drive performance and operation is satisfactory (block 115). If it is time for a drive reevaluation after block 113, or data errors are found at block 117, the change in fly height is measured, as illustrated at block 119. If the fly height has increased (block 121), the process returns to block 107 to optimize the fly height as described previously. If the fly height has not increased, the process continues to block 123. At block 123, a determination is made as to whether the fly height has decreased. If the fly height has not diminished, the drive is satisfactory and the process again returns to block 115. If the fly height has decreased, the internal pressure of the drive is increased, as depicted at block 125. The drive pressure will continue to be increased until the minimum fly height is achieved, as illustrated by the loop between blocks 127 and 125. Once the minimum fly height is achieved, the process terminates at block 115 and the drive is ready for operational use.

During normal operation (FIG. 4), the process and method begins at block 131. A timer is initiated (depicted at block 133) and a determination is then made at block 135 as to whether the predetermined time delay has expired. If the timer has not expired, the process proceeds to block 137 wherein a determination of data errors in the drive is made. If no data errors are detected, the process terminates at block 139. If the timer has expired or if data errors are detected in the previous step, the process proceeds to block 141 wherein the change in fly height over time is measured, as illustrated at block 143. If the change in fly height over time has not exceeded a predetermined threshold, the process again terminates at block 139. However, if the change in fly height over time has exceeded the threshold, an error message reports that the drive is leaking, as depicted at block 145, prior to terminating the process at block 139.

The present invention has many advantages. The method and system described herein offers a low cost, reliable measurement of internal disk enclosure pressure. The head flying height change caused by changes in local pressure is inherently calibrated based on the Wallace equation. The flying height measurement can be used to calibrate an independent pressure transducer (which tend to drift). By measuring the rate of change in flying height with time, the current efficiency of the vacuum pump can be estimated. A pressure leak in a disk enclosure can be determined by turning the vacuum pump off and measuring the change in flying height versus time. Acceptable slider-disk clearance can be verified by measuring flying height versus disk enclosure pressure. If a head is flying too low, the vacuum level can be decreased so that the head flying height is not reduced too much and the data from the drive can be backed up in a timely manner prior to failure.

While the invention has been shown or described in only some of its forms, it should be apparent to those skilled in the art that it is not so limited, but is susceptible to various changes without departing from the scope of the invention.

What is claimed is:

1. A computer hard disk drive assembly, comprising:

a sealed base having an interior with a pressure;

a motor mounted to the base and having a rotatable spindle;

a media disk mounted to the spindle within the interior of the base;

an actuator pivotally mounted within the interior of the base, the actuator having a head that flies above the media disk at a known fly height for selectively interacting with the media disk;

pressure means mounted to the base for selectively manipulating the pressure of the sealed base; and a controller mounted to the base for controlling operation of the drive assembly, wherein the controller compares a current fly height of the head to the known fly height and regulates the pressure means in response thereto.

2. The computer hard disk drive assembly of claim 1 wherein the controller adjusts the pressure in the base via the pressure means for optimizing the current fly height of the head above the media disk.

3. The computer hard disk drive assembly of claim 1, further comprising a pressure transducer for monitoring the pressure in the base.

4. The computer hard disk drive assembly of claim 1 wherein the pressure means is a vacuum pump.

5. The computer hard disk drive assembly of claim 1 wherein the pressure means is a compressor.

6. A computer hard disk drive assembly, comprising:

a sealed base having an interior with a pressure;

a motor mounted to the base and having a rotatable spindle;

a media disk mounted to the spindle within the interior of the base;

an actuator pivotally mounted within the interior of the base, the actuator having a head that flies above the media disk at a known fly height for selectively interacting with the media disk;

a vacuum pump mounted to the base for selectively evacuating the interior of the sealed base and lowering the pressure therein; and a controller having a microprocessor for controlling operation of the drive assembly, a fly height measurement device for measuring a current fly height of the head above the media disk, and a pressure controller for actuating the vacuum pump, wherein the microprocessor compares the current fly height to the known fly height and regulates the pump in response thereto; and wherein the controller adjusts the pressure in the base via the pressure controller and vacuum pump for optimizing the current fly height.

7. The computer hard disk drive assembly of claim 6, further comprising a pressure transducer for monitoring the pressure in the base.

8. A method for enhancing the performance of a hard disk drive, comprising the steps of:

(a) providing the disk drive with a sealed base, a motor having a rotatable spindle, a media disk mounted to the spindle in the base, an actuator pivotally mounted in the base with a head for interacting with the disk;

(b) establishing a known fly height of the head relative to the disk;

(c) operating the disk drive at a desired pressure other than ambient pressure;

(d) comparing a current fly height of the head with the known fly height; and (e) manipulating pressure in the disk drive in response to step (d) to maintain the disk drive at the desired pressure and adjust the current fly height.

9. The method of claim 8 wherein step (c) comprises operating the disk drive at a vacuum.

10. The method of claim 8 wherein step (b) comprises testing the disk drive during manufacturing to establish the known fly height and then storing the known fly height in the disk drive.

11. The method of claim 8, further comprising the step of measuring pressure in the disk drive with a pressure transducer and performing step (e) in response thereto.

12. A method for enhancing the performance of a hard disk drive, comprising the steps of:

(a) providing the disk drive with a sealed base, a motor having a rotatable spindle, a media disk mounted to the spindle in the base, an actuator pivotally mounted in the base with a head for interacting with the disk;

(b) establishing a known fly height of the head relative to the disk during manufacturing of the disk drive and storing the known fly height in the disk drive;

(c) operating the disk drive at a desired vacuum;

(d) comparing a current fly height of the head with the known fly height; and (e) manipulating pressure in the disk drive in response to step (d) to maintain the disk drive at the desired vacuum and adjust the current fly height.

13. The method of claim 12, further comprising the step of measuring pressure in the disk drive with a pressure transducer and performing step (e) in response thereto.

* * * * *